United States Patent

Murata et al.

[11] Patent Number: 5,413,475
[45] Date of Patent: May 9, 1995

[54] SERIAL TWO-STAGE EXTRUDER

[75] Inventors: Yoshinori Murata; Yukio Goto; Yukio Tamura; Ryoji Mouri; Toshio Miki, all of Nagoya; Masaki Ishikawa, Ichinomiya, all of Japan

[73] Assignee: Mitsubishi Jukogyo Kabushiki Kaisha, Tokyo, Japan

[21] Appl. No.: 24,311

[22] Filed: Mar. 1, 1993

[30] Foreign Application Priority Data

Feb. 27, 1992 [JP] Japan .................. 4-075565
Feb. 28, 1992 [JP] Japan .................. 4-075791
Sep. 11, 1992 [JP] Japan .................. 4-267781

[51] Int. Cl.⁶ .............................. B29C 47/00
[52] U.S. Cl. ........................ 425/205; 366/82; 366/83; 366/88; 366/91; 425/208; 425/378.1; 425/382.3; 425/382.4
[58] Field of Search .............. 366/80, 81, 82, 83, 366/88, 91, 99; 425/143, 205, 208, 209, 378.1, 382.3, 382.4

[56] References Cited

U.S. PATENT DOCUMENTS

| | | |
|---|---|---|
| 2,453,088 | 11/1948 | Dulmage . |
| 2,702,410 | 2/1955 | Brown .................. 425/208 |
| 3,174,185 | 3/1965 | Gerber .................. 366/99 |
| 3,331,101 | 7/1967 | Thomas, Jr. . |
| 3,860,220 | 1/1975 | Matsubayashi et al. . |
| 4,007,922 | 2/1977 | Tamura .................. 366/81 |
| 4,128,342 | 12/1978 | Renk .................... 366/99 |
| 4,336,213 | 6/1982 | Fox ...................... 425/382.3 |
| 4,408,887 | 10/1983 | Yamaoka .............. 366/82 |
| 4,595,546 | 6/1986 | Wheeler, Jr. ......... 425/208 |
| 4,680,132 | 7/1987 | Clarke et al. ......... 425/209 |
| 4,695,165 | 9/1987 | Fukumizu et al. ... 425/209 |
| 4,746,478 | 5/1988 | Fujisaki et al. ....... 425/205 |
| 5,110,279 | 5/1992 | Amemiya et al. .... 425/209 |
| 5,156,790 | 10/1992 | Cucchisi et al. ...... 425/208 |
| 5,267,788 | 12/1993 | Rockstedt ............. 425/208 |

FOREIGN PATENT DOCUMENTS

| | | |
|---|---|---|
| 284424 | 1/1970 | Austria . |
| 1176182 | 4/1959 | France . |
| 2304088 | 8/1973 | Germany . |
| 2408936 | 9/1975 | Germany . |
| 2516376 | 10/1975 | Germany ............... 425/208 |
| 2923219 | 8/1984 | Germany . |
| 52-856 | 1/1977 | Japan .................... 366/81 |
| 60-24912 | 2/1985 | Japan .................... 366/83 |
| 62-167025 | 7/1987 | Japan . |
| 3-126519 | 5/1991 | Japan . |
| 2171951 | 9/1986 | United Kingdom ... 425/205 |
| 8501911 | 5/1985 | WIPO ................... 425/205 |
| 8606679 | 11/1986 | WIPO ................... 425/205 |

*Primary Examiner*—Charles S. Bushey
*Attorney, Agent, or Firm*—Wenderoth, Lind & Ponack

[57] ABSTRACT

In a serial two-stage extruder, the first-stage extruder has a screw including a feed screw section having a length within a range of 5 to 9 the major diameter thereof, a mixing screw section having a hexagonal cross section and a pitch of 1 to 3 times the major diameter thereof, and a metering screw section having a screw groove of an appropriate depth. The second-stage extruder includes an extruding screw and a barrel. The extruding screw has a screw groove of an appropriate depth and a dulmage formed at the tip end of the screw. The dulmage has a plurality of fins cooperating with fins of the barrel. Alteratively, in the second-stage extruder, the dulmage may have a plurality of axially spaced stages of fins. Configurations of the fins in each respective stage are identical but various characteristics of the fins vary from stage to stage. In this case, the barrel does not have fins.

5 Claims, 11 Drawing Sheets

SERIAL TWO-STAGE EXTRUDER

BACKGROUND OF THE INVENTION

1. Field of the Invention

The present invention relates to a serial two-stage extruder for melting and mixing plastics, rubber or the like, and performing granulation and extruding various products such as films, sheets, and pipes.

2. Description of the Prior Art

A serial two-stage extruder in which two extruders are connected in series has been conventionally used to melt and mix raw material, especially in preparation for directly forming films, sheets or the like from the raw material. In fact there is no practical means to extrude a raw material that is difficult to melt and mix other than the known serial two-stage extruders. Therefore, this two-stage extruder is now employed especially frequently. Before this serial two-stage extruder was used, raw material, that was difficult to melt and mix, was first granulated (pelletized), and films, sheets or the like were manufactured in a separate shaping line by making use of the prepared pellets.

Figure 21:
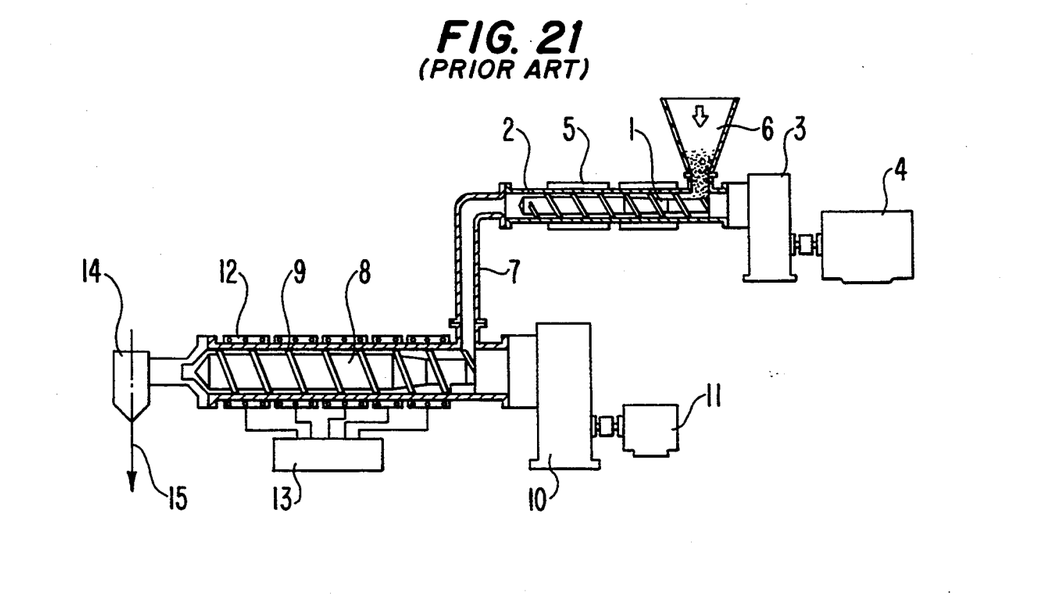
FIG. 21 is a schematic longitudinal sectional view of a serial two-stage extruder in the prior art.

FIG. 21 is a schematic of a serial two-stage extruder in the prior art. In this figure, an extruder shown at the right upper section is a first-stage extruder, an extruder shown at the left lower section is a second-stage extruder, and an extruding end of the first-stage extruder and a molten resin introducing end of the second-stage extruder are connected by a connecting pipe 7.

Normally, a screw 1 and a cylinder 2 of the first-stage extruder have a small diameter and a high speed to carry out the plasticizing and melting of the raw material. A screw 8 and a cylinder 9 of the second-stage extruder have a large diameter and a low speed and carry out the cooling, homogenizing and extruding of the raw material. It is to be noted that in FIG. 21, reference numeral 3 designates a speed-reduction drive unit, numeral 4 designates a driving electric motor, numeral 5 designates a warm-up heater, numeral 6 designates a hopper, numeral 10 designates a speed-reduction drive unit, numeral 11 designates a driving electric motor, numeral 12 designates a warm-up heater, numeral 13 designates a cylinder cooling unit, numeral 14 designates a die, and numeral 15 designates an extruded product. The above-described type of serial two-stage extruder in the prior art is disclosed in U.S. Pat. No. 3,860,220.

If the necessary effects on the resin are respectively produced by two extruders as described above, it becomes possible to extrude a large amount of product with good quality by means of a compact extruder. Furthermore, in order to achieve these results with materials which are hard to mix, an extruder was proposed in Laid-Open Japanese Patent Specification No. 3-126519 (1991) in which the barrel of the first-stage extruder has a polygonal cross section over part of or the entire longitudinal axis of the barrel.

Normally, the first-stage extruder assumes a role of melting and mixing the raw materials, while the second-stage extruder assumes a role of homogenizing the molten materials and stably extruding the molten materials against resistance offered by the die. However, recently, materials which are hard to mix have been used increasingly to manufacture diverse and complex products. That is, the use of polymer blends which are mixtures of different kinds of resins and the use of resin mixed with a large amount of various kinds of fillers have increased. In some cases, depending on the type of raw material, the screw of the first-stage extruder must be rather long to sufficiently mix the raw materials.

In the extruder disclosed in Laid-Open Japanese Patent Specification No. 3-126519 (1991), a barrel having a polygonal cross section offers some improvement in feeding and plasticizing raw materials depending upon a number of corners of the polygonal shape of the cross section and the lead and the like of the screw of the first-stage extruder. However, in practice, insufficient mixing may still occur with certain raw materials.

The screw of the second-stage extruder aims at homogenizing the resin almost melted in the first-stage extruder and at extruding the resin at a constant rate to stabilize both the quantity and temperature of the resin. Temperature differences of the resin within the screw groove, produced by a transverse flow of the resin passing through the screw of the second-stage extruder, are eliminated by a dulmage at the tip end of the screw as shown in FIGS. 22 to 25. However, the dulmage in the prior art effects limited mixing and kneading actions. Thus, if the screw groove is too deep, temperature difference of the resin produced within the screw groove cannot be eliminated. Hence, resin having a temperature distribution (temperature differences throughout the resin) was extruded, resulting in unacceptable products. Furthermore, it was impossible to enhance the function of the second-stage extruder to a desired extent. In this connection, the depth of the screw groove of the second-stage extruder in the prior art is typically 0.05 times as small as the outer diameter of the screw or larger, namely 0.1 times as small as the outer diameter or smaller.

Figure 22:
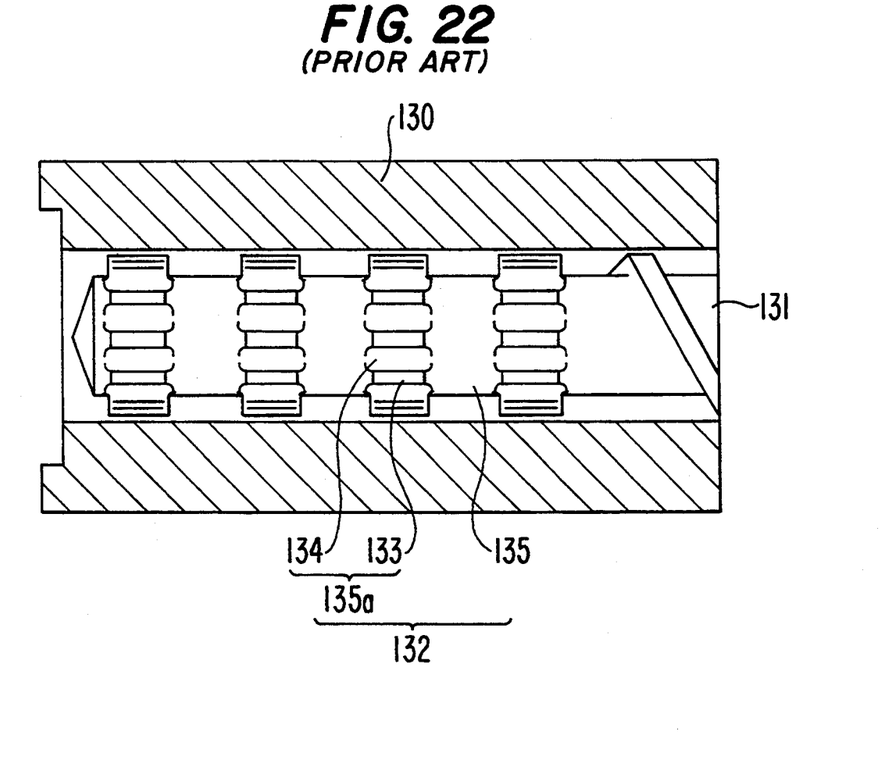
FIG. 22 is an enlarged side view of a tip end portion of a dulmage type of mixing-kneading screw of a second-stage extruder in the prior art.
Figure 23:
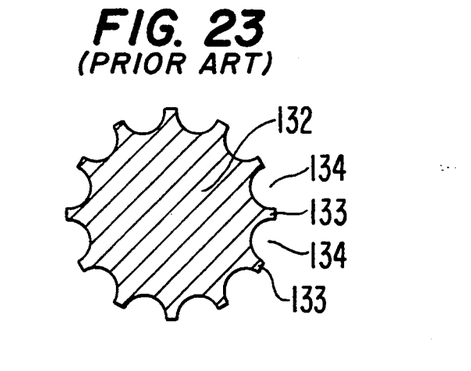
FIG. 23 is a cross-sectional view of a fin stage of the dulmage shown in FIG. 22.

FIG. 22 shows one example of a representative dulmage (4-stage). FIG. 23 shows a cross section of the screw taken through a stage of fins of the dulmage. In the screw of a uniaxial extruder shown in FIG. 22, the dulmage 132 is provided at the tip end of a screw 131 for effecting a mixing-kneading action. This dulmage 132 is formed of a number of stages 135a of fins 133 defining grooves 134 therebetween, and a cylinder portion 135 having a somewhat smaller outer diameter than a pitch circle of the grooves 134.

In FIG. 22, resin fed from the screw 131 to the dulmage 132 is divided by the fins 133, then flows downstream while turning within the small semicircular grooves 134, and is rejoined in the cylinder portion 135 to be mixed and kneaded. Subsequently, the resin is again divided by the downstream fins 133, and enters the corresponding grooves 134 so that mixing and kneading of the resin is repeated.

Figure 24:
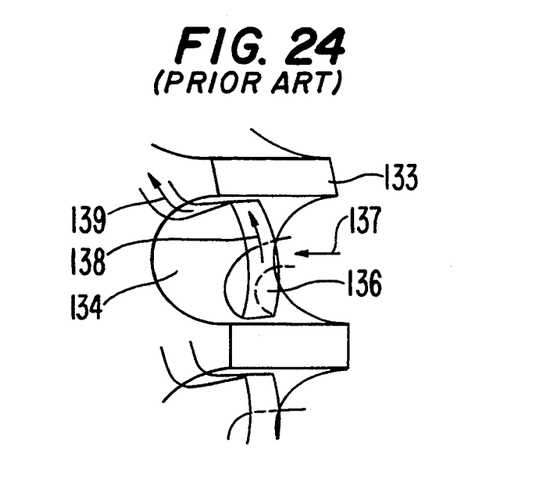
FIG. 24 is a schematic perspective view of the fin stage showing a state of resin revolving within a fin groove.

Here, attention will be paid to the turning of the resin within the grooves 134. FIG. 24 shows a state of the resin within a groove 134 in a simplified manner, in which state the resin 136 proximate the surface of the screw moves along a surface defining the bottom of the groove 134 as shown by an arrow 137. Thereafter, it is forced to the outer circumference of the screw along the surface defining the groove 134, and moves along the inner surface of the cylinder as shown by arrow 138. Thereafter, it again moves along the surface of the screw defining the groove 134 towards the bottom of the groove 134, and as shown by an arrow 139, it flows from the groove 134 to the downstream cylinder portion 135.

It is well known that the number of times the resin traverses a groove 134 in each stage of fins depends upon the operating conditions of the extruder, that is, the rotational speed of the screw, the cylinder temperature, the pressure of resin at the tip end of the screw and the like, provided that the shapes of the grooves 134 are identical.

Figure 25:
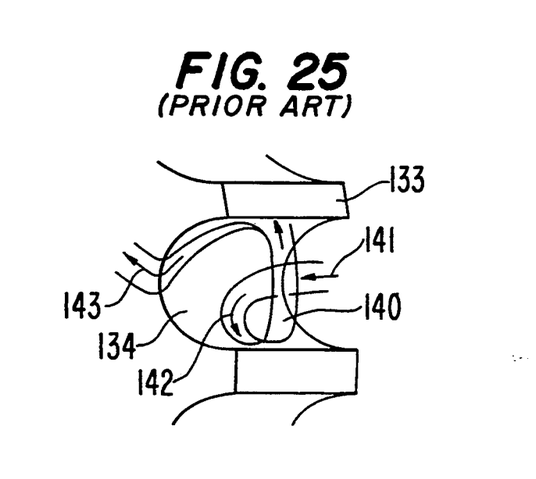
FIG. 25 is a schematic perspective view of the fin stage also showing an unfavorable state of the resin within the fin groove.

Accordingly, in a uniaxial extruder having a dulmage as shown in FIG. 25, resin 140 existing at the bottom of the groove in the inlet portion of the groove 134 would traverse the surfaces defining the groove 134 and the cylinder 130 as indicated by arrows 141, 142 and 143, would then reach the bottom of the groove at the outlet of the groove 134, and in some cases, the phase of the resin within the fin grove would not vary. In such case, the dividing of the resin with the fins 133 and the causing of the resin to revolve within the grooves 134 is insignificant.

As described above, in the dulmage in the prior art shown in FIG. 22, the configurations of the fins 133 and the grooves 134 in each stage are the same. Hence, the number of revolutions of resin within the grooves 134 are equal. If the resin existing at the bottom of the groove in the inlet portion of the groove 134 makes one revolution or a whole number of revolutions within the groove 134, in same cases, resin fed from the screw 131, especially resin existing proximate the surface of the screw 131, almost would not be mixed and kneaded even after passing through the dulmage. Under such an operating condition in which the mixing and kneading performance is extremely poor, an uneven temperature distribution and an unevenly kneaded state would arise.

As described above, the heretofore known dulmage type of screw employed in a uniaxial extruder or an injection molding machine has a structural shortcoming in that there exists an operational range wherein the mixing and kneading of the resin is poor giving rise to an uneven temperatures distribution and an unevenly kneaded state of the resin.

SUMMARY OF THE INVENTION

An object of the present invention is to provide a first-stage extruder of a serial two-stage extruder which exhibits an excellent mixing performance and is facile.

Another object of the present invention is to provide a dulmage type of second-stage extruder of a serial two-stage extruder, which exhibits an excellent mixing and kneading performance, which does not create an uneven temperature distribution in the resin, and which kneads resin evenly, even if the depth of the groove defined between the thread forms of the screw is large.

To achieve the first object of the present invention, a first-stage extruder of the serial two-stage extruder includes a feed screw section having a length 5 times or more and 9 times or less as large as the major diameter of the screw, a barrel portion surrounding the feed screw section and having a cylindrical inner cavity, a mixing screw section having a hexagonal cross section and a pitch of 1 to 3 times as large as the major diameter of the mixing screw section, a barrel section surrounding the mixing screw section and having a hexagonal inner cavity, a metering screw section having a screw groove depth of 0.07 times or more and 0.11 times or less the major diameter of the metering screw section, and a cylindrical barrel surrounding the metering screw. The screw sections are disposed sequentially from a raw material feed port of the first stage extruder in the direction of feeding of raw material, and the screw sections and portions of the barrel are integrated, respectively.

In the mixing zone of the first-stage extruder, the hexagonal screw section, having a pitch within the above-described range according to the present invention, has a raw material feeding capability that is well-matched to that of the feeding screw section in the feed zone, and it has a shape that readily effects plasticizing. Also, the screw section in the metering zone accommodates for variations in resin flow up to the mixing zone, feeds the resin after forming a stabilized flow of resin, and insures a sufficient extruding rate.

To achieve the second object of the present invention, a second-stage extruder of the serial two-stage extruder has a screw in which the depth of the screw groove is 0.11 times or more and 0.2 times or less than the major diameter of the screw, a cylindrical barrel surrounding the screw, a dulmage at the tip end of the screw and having a plurality of fins, and a barrel having a plurality of radially extending fins at its inner circumference. The fins of the barrel are disposed alternately with the fins of the dulmage in the axial direction of the screw. Further, the barrels are integrated.

In addition, axial lengths of the fins of the dulmage may gradually decrease in the downstream direction of the screw.

According to the present invention, the temperature distribution of resin produced in the screw groove is equalized even if the screw groove is rather deep due to the fact that the fins of the dulmage and barrel enhance the mixing and kneading action effected by the screw to a degree higher than that in the prior art. Thus, the second-stage extruder may operate at a higher extruding rate than the prior art without any accompanying degradation in the quality of products produced.

To also achieve the second object of the present invention, in the second-stage extruder the dulmage may have a plurality of stages of fins, the fins in each stage being aligned in the rotational direction of the screw, and the plurality of stages being spaced in the axial direction of the screw. In this case, the cylindrical barrel has no fins. Further, configurations of the fins of each stage are identical. However, among the stages, at least one of various characteristics of the fins, namely fin groove depth, fin groove width, number of fins and an axial length of the fins, varies. For instance, when any one of the fin groove depth, fin groove width and a number of fins varies among the respective stages, the cross sections of the passageways through which the resin flows in the stages varies from stage to stage.

On the other hand, the lengths of the stages in the axial direction of the screw can successively increase towards an outlet of the second-stage extruder.

Still further, the numbers of fins in the respective stages can increase from stage to stage in succession towards an outlet of the second-stage extruder.

As described above, in a second-stage extruder of a serial two-stage extruder according to the present invention, due to the fact that the configurations of the fins in each stage of fins of the dulmage are identical but various configurations of the fins vary from stage to stage, the number of times the resin revolves within the fin grooves varies from stage to stage. Hence, the mixing and kneading action effected by the dulmage is applied uniformly of the entirety of the raw resin material. Thus, the mixing-kneading performance is not affected by operating conditions, whereby an uneven temperature distribution and uneven kneading of the resin is eliminated.

Furthermore, as an additional feature of the present invention, the second-stage extruder includes a high-pressure shaft seal in the form of a viscoseal sleeve inserted between a base portion of the screw and the barrel. A groove in the form of multiple-start square threads are defined on the inner circumferential surface of the viscoseal sleeve.

Therefore, in addition to the above-mentioned excellent mixing-kneading performance, the second-stage extruder according to the present invention prevents resin from leaking.

The above-mentioned and other objects, features and advantages of the present invention will become more apparent by referring to the following description of a number of preferred embodiments of the present invention made in conjunction with the accompanying drawings.

DETAILED DESCRIPTION OF THE PREFERRED EMBODIMENTS

Figure 1:
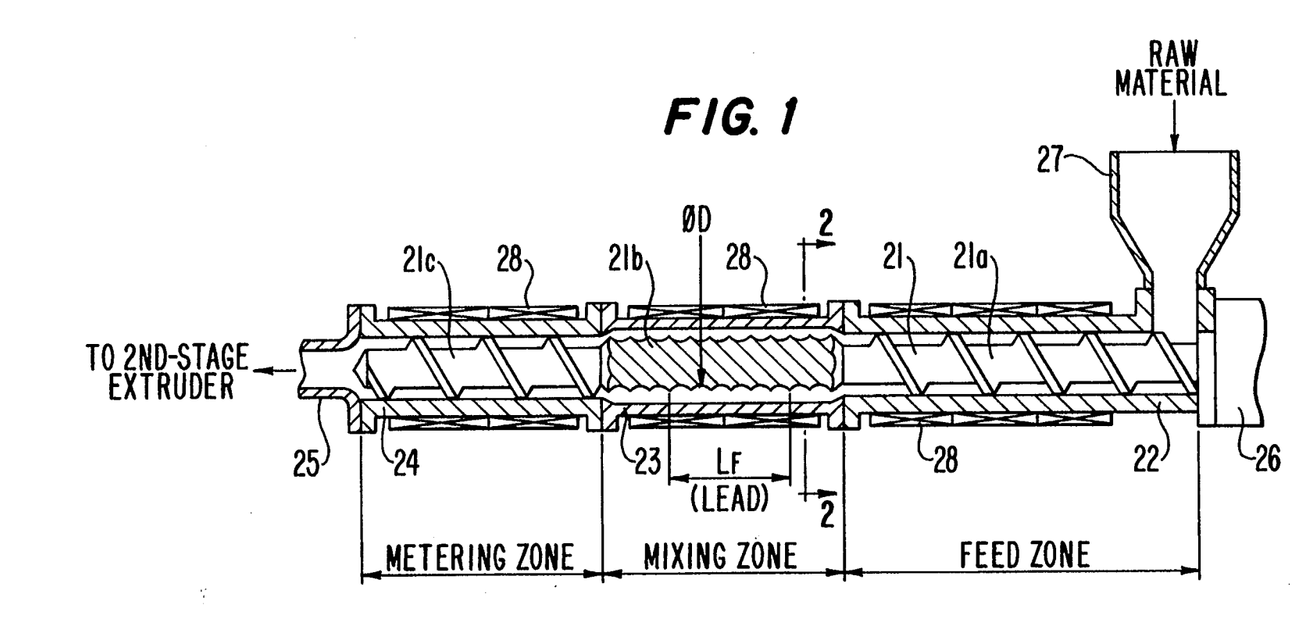
FIG. 1 is a longitudinal view, partially in section, of an extruding screw portion of one preferred embodiment of a first-stage extruder according to the present invention.
Figure 2:
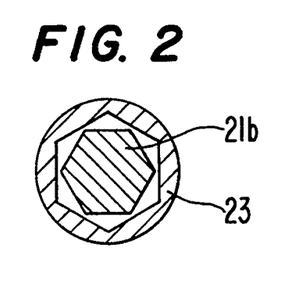
FIG. 2 is a cross-sectional view taken along line 2—2 in FIG. 1.
Figure 3:
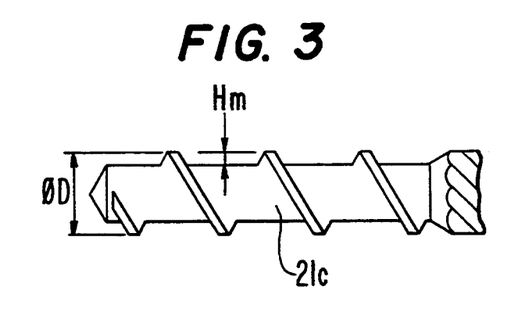
FIG. 3 is a side view of a screw provided in a metering zone of the extruder shown in FIG. 1.

The structure of a screw and a barrel of a first-stage extruder in a serial two-stage extruder according to the present invention is shown in FIGS. 1-3. A screw 21 in FIG. 1 consists of three parts. That is, these parts are a normal screw 21a in a feed zone, a mixing screw 21b having a hexagonal cross-sectional shape in a mixing zone, and a normal screw 21c in a metering zone. Outside barrels corresponding to the respective screw parts 21a, 21b and 21c are a cylindrical barrel 22 in the feed zone, a barrel 23 having a hexagonal inner cross-sectional shape in the mixing zone, and a cylindrical barrel 24 in the metering zone.

If the length of the screw 21a in the feed zone is represented by Ll and the outer diameter of the screw 21a is represented by D, then a relation of $9D \geq L1 \geq 5D$ is fulfilled. Also, if the helical lead of the mixing screw 21b is represented by Lr and the outer diameter of the screw 21b is represented by D, then a relation of $Lr=1D-3D$ is fulfilled. Furthermore, if a depth of a screw groove of the metering screw 21c is represented by Hm and the outer diameter of the same screw 21c is represented by D as shown in FIG. 3, then a relation of $Hm=0.07D-0.11D$ is fulfilled. It is to be noted that reference numeral 25 designates a connecting pipe for conveying molten resin from the first-stage extruder to the second-stage extruder, numeral 26 designates a drive unit for the screw 21, numeral 27 designates a hopper, and numeral 28 designates a heater.

Figure 4:
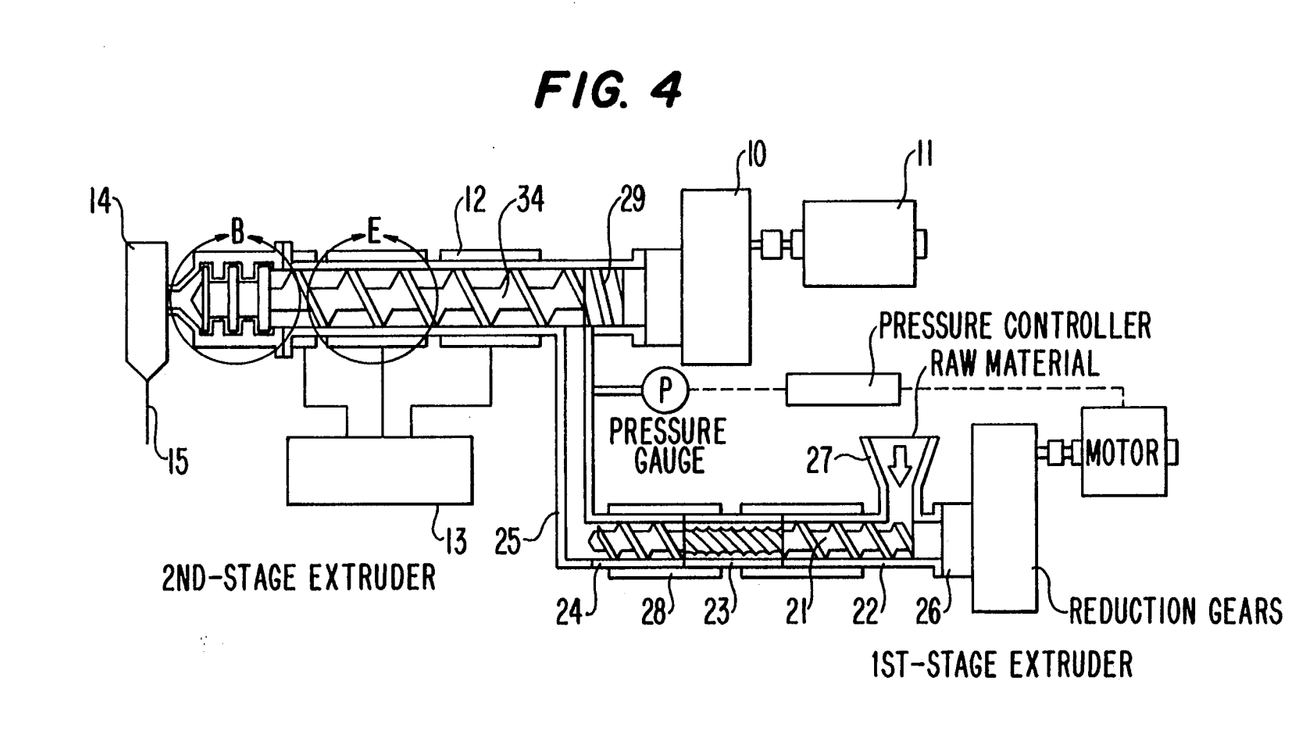
FIG. 4 is a longitudinal schematic view, partially in section, of one preferred embodiment of a serial two-stage extruder according to the present invention.

It has been confirmed that extruding capability can be further improved by combining a second-stage extruder as shown in FIG. 4 with the first-stage extruder. Details of an encircled portion B and an encircled portion E of the second-stage extruder shown in FIG. 4 are illustrated in FIGS. 5 to 9.

The structure shown in FIGS. 4 to 9 is constructed in the following manner. At first, a high-pressure shaft seal, which can effect a seal up to a resin pressure of 200 kgf/cm$^2$ (see Japanese Patent Application No. 3-297664 (1991) is provided in a shaft seal portion 29 at an inlet of the second-stage extruder.

Figure 10:
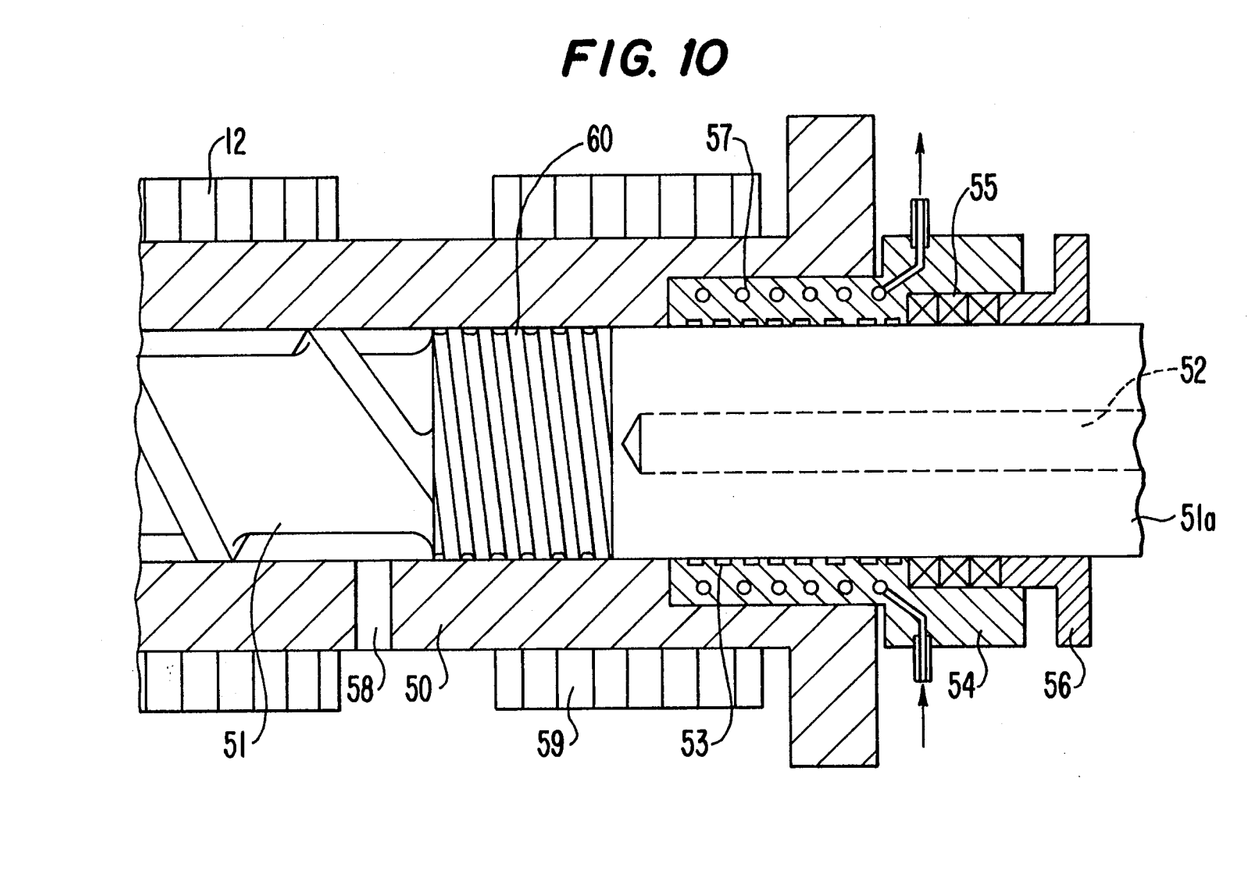
FIG. 10 is a longitudinal view, partially in section, of a base portion of a second-stage extruder of a serial two-stage extruder according to the present invention.

More specifically, referring to FIG. 10, a screw 51 is inserted within a cylinder 50 of the second-stage extruder, and in a base portion 51a of the screw 51 is formed a cooling bore 52. Between the base portion 51a of the screw 51 and the cylinder 50 is disposed a viscoseal sleeve 54 having multiple-start square threads on its inner circumference, and a packing gland 55 provided between the same sleeve 54 and the base portion 51a of the screw 51 is pressed by a packing gland 56. In addition, a cooling jacket 57 is provided in a portion of the viscoseal sleeve 54 having multiple-start square threads 53. It is to be noted that in this figure, reference numeral 12 designates a heater, numeral 58 designates a raw material molten resin feed port, numeral 59 designates a heater jacket, and resin feed port, numeral 59 designates a heater jacket, and numeral 60 designates a square thread portion of the screw 51 provided between a main portion of the screw 51 and the base portion 51a.

Molten resin enters between the screw 51 and the cylinder 50 through the feed port 58 from a connecting pipe (not shown). Although the screw 51 is rotating, the resin begins to flow backwards due to an inlet resin pressure. In this case, most of the maximum seal pressure is generated at the square thread portion 60 on the screw side.

When this backflowing resin arrives at the viscoseal sleeve, leakage can be suppressed to a necessary minimum extent by a sealing pressure generated by the multiple-start square threads 53 provided on the inner surface of the same sleeve 54. Adjustment of a proper leakage rate is effected by adjusting the temperature of the heater jacket 59, the temperature of the cooling jacket 57 in the viscoseal sleeve 54, and by cooling the screw 51 by feeding coolant water into the cooling bore 52 provided in the base portion 51a of the screw 51 via a rotary joint and an electromagnetic valve (not shown). It is to be noted that the packing gland 55 and the packing gland 56 are provided for the purpose of preventing leakage when the screw stops rotating.

The multiple-start square threads 53 are to have a lead in the range of 0.5D-1.5D, a groove depth in the range of 1/2OOD-1/4OD and a length in the range of 1D-3D, with respect to the diameter D of the shaft of the screw 51. Similar multiple-start square threads may be adopted for the square thread portion 60.

If the inlet resin pressure of the second-stage extruder were high, resin would leak to the screw base portion and the resin would also fill the multiple-start square thread portion of the viscoseal sleeve 54. When the screw 51 rotates, shearing would occur between the same screw 51 and the viscoseal sleeve 54 having multiple-start square threads, a large propelling force well in excess of the inlet pressure would occur in the multiple-start square thread portion 53, and the backflow of resin would stop.

A pressure rise at a thread seal portion is represented theoretically by the formula $\Delta P = 6\eta UL/C^2 \cdot 1/A$, where:

$\eta$: viscosity (kg·sec/cm$^2$),
U: circumferential velocity (cm/s),
L: screw seal length (cm),
C: clearance between a screw and a cylinder (cm),
A: seal coefficient (—).

As will be seen from the theoretical formula, in order to control the leaking (backflow), a mechanism for changing the viscosity variable becomes necessary. In this connection, the circumferential velocity U is set by the required production rate, and it cannot be varied independently. A screw seal length L and a clearance C are constant. Therefore, by variably controlling a temperature of the viscoseal sleeve 54 itself and a temperature of the screw base portion 51a, the viscosity of the resin therebetween can be varied, whereby a pressure rise at the screw seal portion can be varied. Temperature control of the viscoseal sleeve 54 and temperature control of the screw can be achieved by connecting controllers of the sleeve 54 and screw 51 to a temperature controller of a metallic die rather than to an independent temperature controller.

According to the second-stage extruder described above, because molten resin is prevented to a great extent from leaking from the screw base portion, it is possible to prevent environmental pollution and to greatly save labor otherwise needed for cleaning up resin that has leaked from the screw base portion.

Figure 5:
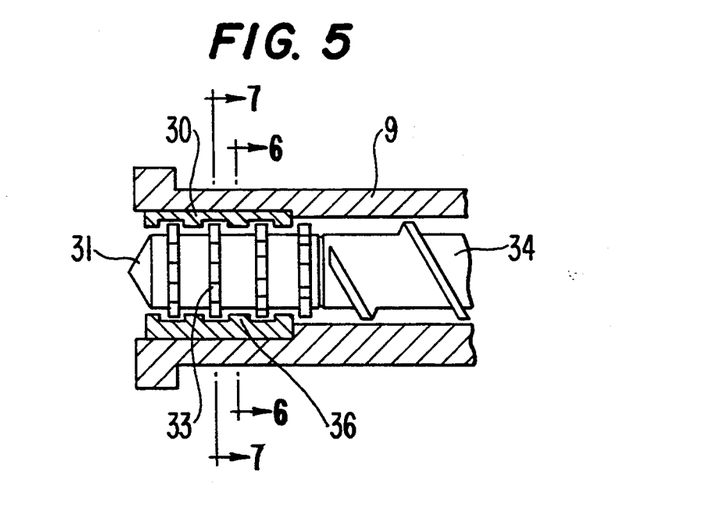
FIG. 5 is an enlarged view of an encircled portion B of the extruder shown in FIG. 4.
Figure 6:
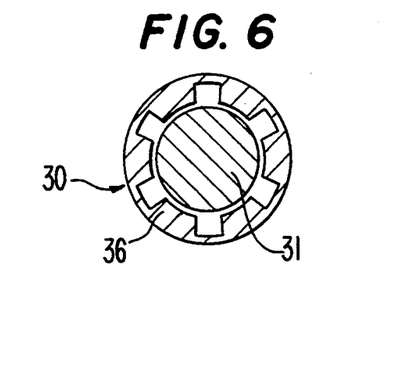
FIG. 6 is a cross-sectional view taken along line 6—6 in FIG. 5.
Figure 7:
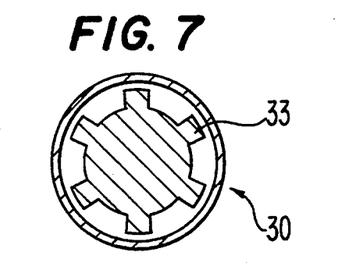
FIG. 7 is a cross-sectional view taken along line 7—7 in FIG. 5.
Figure 9:
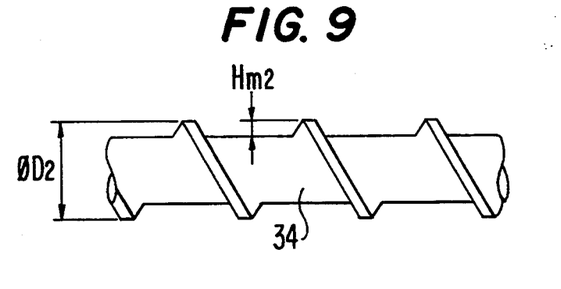
FIG. 9 is an enlarged view of an encircled portion E of the extruder shown in FIG. 4.

Grooves of the second-stage screw 34 are shown in FIG. 9. If a groove depth is represented by Hm$_2$ and a screw outer diameter is represented by D$_2$, a relation of Hm$_2$=0.11D$_2$-0.2D$_2$ is fulfilled. In addition, as shown in FIG. 5, on the outer circumference of the tip end portion 31 of the second-stage screw 34 are formed a plurality of fins 33, while a plurality of fins 36 are also formed on the inner circumference of the corresponding cylinder 30, and these respective fins are disposed alternately with respect to each other in the axial direction (see Laid-Open Japanese Patent Specification No. 62-167025 (1987)).

Figure 8:
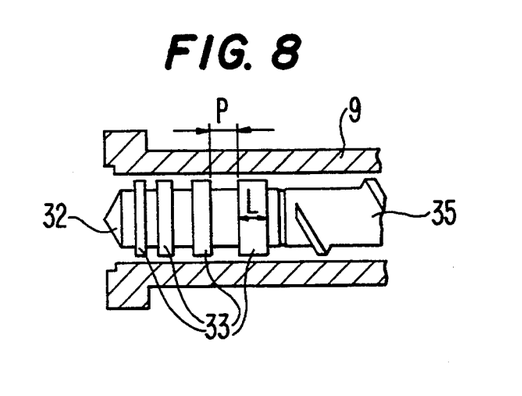
FIG. 8 is an enlarged view of an encircled portion B of the extruder shown in FIG. 4 according to a modified form of the embodiment shown in FIG. 5.

FIG. 8 shows another preferred embodiment of the second-stage extruder in which the dulmage at the tip end portion 32 of the second-stage screw 35 has fins 33. Axial lengths L of the fins decrease gradually towards the tip of the screw (downstream in the direction of the resin flow). Also, the fins 33 are spaced axially from one another at unequal intervals P. It is to be noted that the axial lengths L of the fins 33 could increase gradually towards the tip (downstream direction). Also, in the above-described embodiment, at least one of the fin groove depth, fin groove width and number of fins could vary among the fins. Further, a groove depth of the screw 35 within the range of 0.11 times or more and 0.2 times or less the screw outer diameter.

Now, the operation of the above-described two-stage extruder according to the present invention will be described. Raw material charged into the hopper 27 enters the extruder through a port extending through the cylindrical barrel 22. Then, while being conveyed leftwards by the screw 21a in the feed zone, it is heated by the heater 28, is also compressed, melted and plasticized, and is extruded into the mixing zone. In the mixing zone, the raw material is uniformly stirred and mixed by the hexagonal mixing screw 21b, and delivered to the metering zone.

Since the metering screw 21c in the metering zone has a conveying capability corresponding to the extruding rate of the hexagonal screw 21b upstream thereof, the raw resin material will not stagnate in the mixing zone or be caused to flow irregularly by the metering screw 21c. The raw resin material extruded by the metering screw 21c is conveyed through the connecting pipe 25 to the second-stage extruder.

The raw resin material fed from the first-stage extruder and having passed through the connecting pipe 25, proceeds in the second-stage screw 34 of the second-stage extruder at a high pressure of about 200 kgf/cm$^2$. Raw resin material having reached the tip end of the second-stage screw 34 is perfectly molten under an equalized temperature distribution within the screw groove when it passes fins 33 and 36 of the dulmage shown in FIGS. 5 to 8. Therefore, raw resin material having a uniform temperature distribution is fed to a die 14 at a constant rate.

Table 7 shows test results of a comparison between the prior art extruder and the extruder according to the present invention. These results show that the extruder according to the present invention exhibits remarkable performance compared to the prior art extruder.

The tests were conducted with a 65/90 serial two-stage extruder.

Raw material: Biaxial stretching polypropylene containing 20 wt% of ear fluff for use as a 30 μ film.

TABLE 1

| Raw Material | Maximum Extruding Rate [kg/hr] | Resin Temperature [°C.] | Tip End Pressure [kg/cm$^2$] | Proportion of Variation of Tip End Pressure [%] |
| --- | --- | --- | --- | --- |
| FL6CK pellets Manufactured by Mitsubishi Petrochemical Co., Ltd. | 643 (350) | 259 (275) | 278 (250) | ±0.43% (±0.5%) |
| FL6CK pellets + Fluff 20 wt % | 635 (320) | 261 (275) | 261 (250) | ±0.50% (±0.5%) |

*Parenthesized values indicate performances of φ65/φ90 serial two-stage extruder in the prior art.

The Q/N (extruding amount per unit revolution of screw) of a first-stage extruder in the prior art is about 0.5 [kg/hr/rpm]. The present invention has a value of Q/N that is 1–1.2 times that of the prior art, and the rotational speed of the screw need not be as high. Accordingly, it is possible to prevent a rise in temperature in the barrel.

As described in detail above, the hexagonal mixing screw, having a lead within a predetermined range in the mixing zone of the first-stage extruder according to the present invention, is of a type whose raw material feeding capability is best matched with a feeding capability of the screw in the feed zone. In addition, the screw in the metering zone accommodates for variations in the rate at which resin flows from the mixing zone upstream thereof, so as to stabilize the flow and then deliver the resin to the second-stage extruder. Since the deep-groove screw in the second-stage extruder has a sufficient extruding capability and the dulmage at the tip end of the screw has a resin homogenizing performance matched with an extruding capability of the screw, the extruder can extrude the necessary amount of resin. Therefore, according to the present invention, it is possible to stably feed raw material and extrude it to a maximum extent without sacrificing the plasticizing capability of the first-stage extruder. Hence, the second-stage extruder will fully homogenize the resin and extrude an appropriate amount of high-quality resin products.

Next, a number of preferred embodiments of a dulmage type high mixing-kneading performance screw according to the present invention, employed in the second-stage extruder, will be described with reference to FIGS. 11 to 20.

Figure 11:
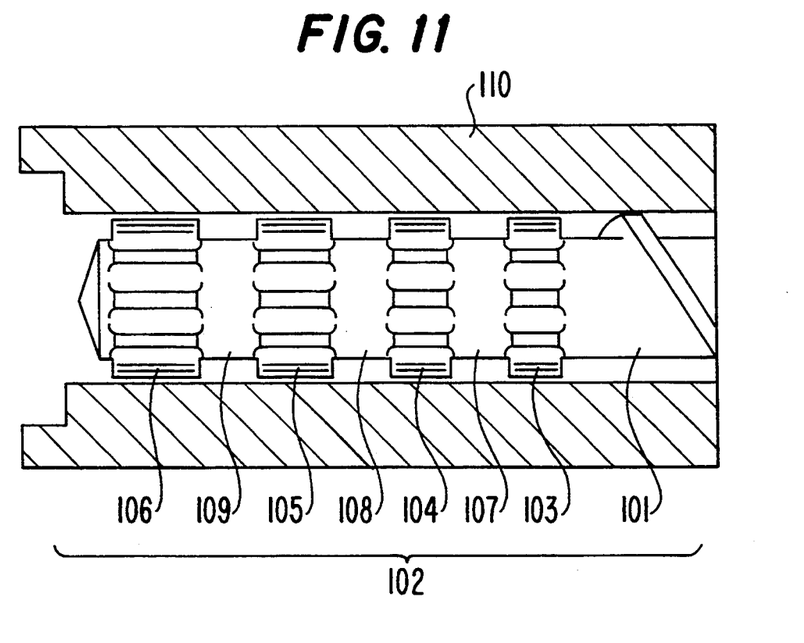
FIG. 11 is a side view of a tip end portion of a preferred embodiment of a high mixing-kneading performance screw according to the present invention.

At first, the dulmage of a first preferred embodiment of the screw according to the present invention will be described with reference to FIGS. 11 to 16. FIG. 11 shows a uniaxial extruder including a screw 101 having a dulmage 102 at the tip end portion thereof. The dulmage includes several stages of fins. The fins in each stage are aligned in the rotational direction of the screw, and the axial lengths of the stages vary. Specifically, the lengths of the fins 103–106 increase, for instance, at each successive stage in the downstream direction.

FIGS. 12 to 16 illustrate the movement of resin within grooves defined between adjacent ones of the fins.

Figure 12:
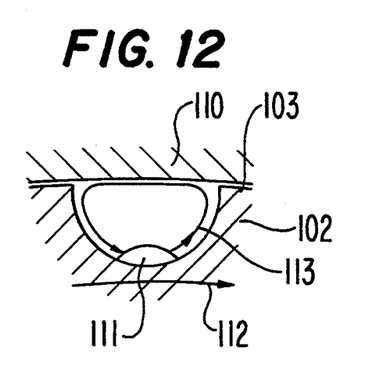
FIG. 12 is an enlarged cross-sectional view of the screw shown in FIG. 11 taken at a fin groove inlet of a fin stage 103.

FIG. 12 shows a portion of fins 103. When the dulmage screw 102 rotates in the direction of arrow 112, resin 111 at the bottom of a groove defined between adjacent fins 103 moves in the direction of arrow 113 along the periphery of a semicircular area delimited by the fins 102 and a cylinder 110 of the dulmage screw.

Figure 13:
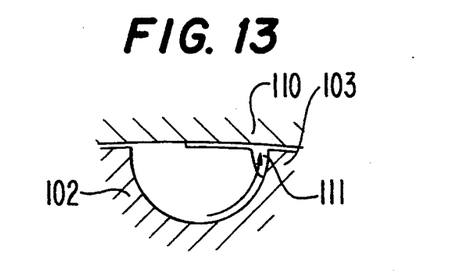
FIG. 13 is a similar view but taken at a fin groove outlet of fin stage 103.
Figure 14:
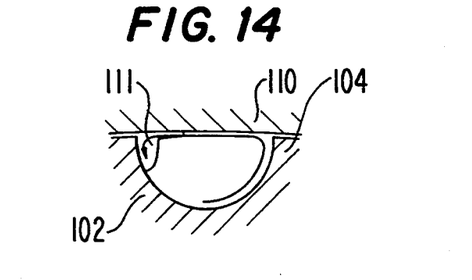
FIG. 14 is a similar view but taken at a fin groove outlet of fin stage 104.
Figure 15:
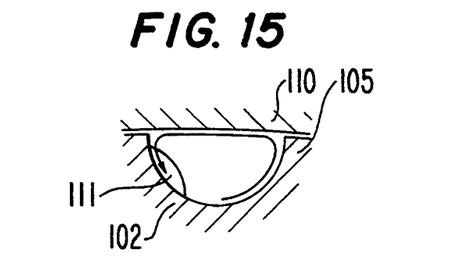
FIG. 15 is a similar view but taken at a fin groove outlet of fin stage 105.
Figure 16:
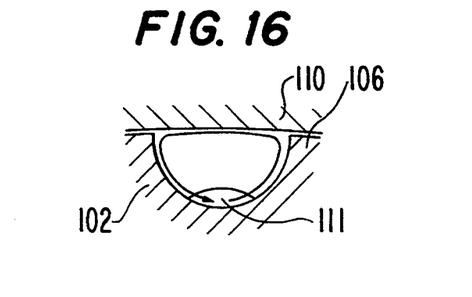
FIG. 16 is a similar view but taken at a fin groove outlet of fin stage 106.

In FIG. 13 the resin 111 has moved to the outlet of the groove defined between adjacent fins 103 of the first stage. FIG. 14 shows the resin 111 at an outlet of a groove defined between adjacent fins 104 of the second stage. FIG. 15 shows the resin 111 at an outlet of a groove defined between adjacent fins 105 of the third stage. FIG. 16 shows the resin 111 at an outlet of a groove defined between adjacent fins 106 of the fourth stage. Except for the fourth stage of fins 106, resin 111 can be separated from the bottom of the grooves. Hence, the present invention obviates the shortcoming of the dulmage in the prior art, that is, the disadvantage that resin flowing through a central portion of a flow passageway cannot be sufficiently replaced and an uneven temperature distribution and an uneven kneading of the molten resin cannot be eliminated.

Figure 17:
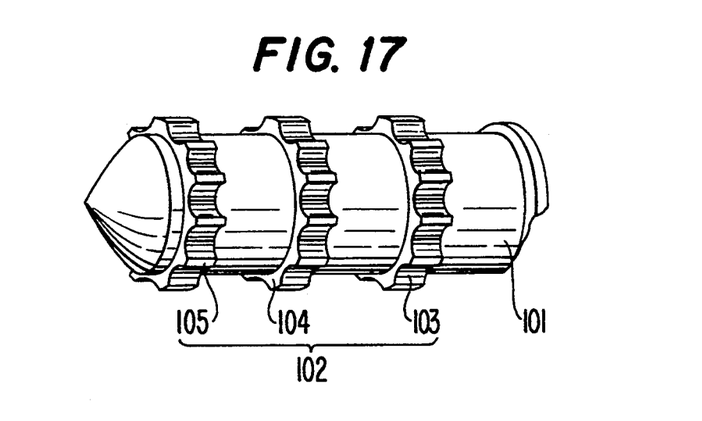
FIG. 17 is a perspective view of a tip end portion of a second preferred embodiment of a high mixing-kneading performance screw according to the present invention.

FIG. 17 shows the dulmage of a second preferred embodiment of the dulmage screw. In this embodiment the depths of the grooves between the fins vary throughout the stages of fins, whereby the number of times the resin traverses a groove varies from stage to stage. More particularly, depths of the fins grooves become successively shallower in a sequence from the stage of fins 103, to the stage of fins 104 and to fins 105.

Figure 18:
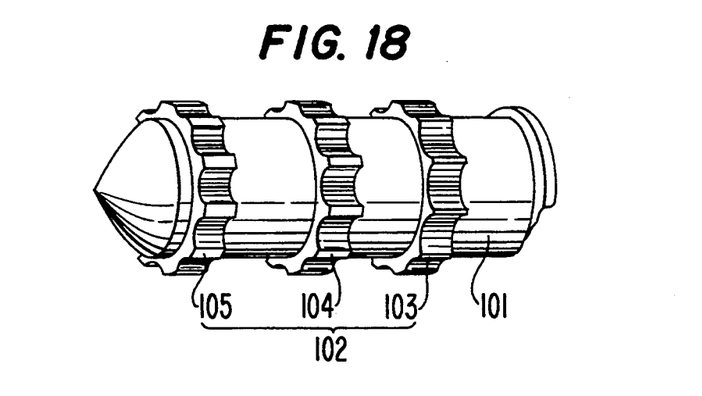
FIG. 18 is a perspective view of a tip end portion of a third preferred embodiment of a high mixing-kneading performance screw according to the present invention.

FIG. 18 shows the dulmage of a third preferred embodiment of a dulmage screw. In this embodiment the widths of the fin grooves (as taken in the rotational direction) vary from stage to stage, whereby the number of times the resin will traverse a fin groove varies from stage to stage. More particularly, the fin groove widths become successively narrower in a sequence from the stage of fins 103, to fins 104 and to fins 105.

Figure 19:
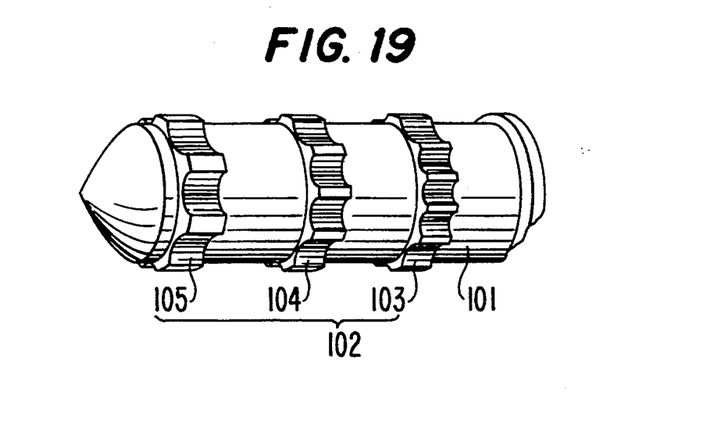
FIG. 19 is a perspective view of a tip end portion of a fourth preferred embodiment of a high mixing-kneading performance screw according to the present invention.

FIG. 19 shows the dulmage of a fourth preferred embodiment of the dulmage screw. In this embodiment the number of fins varies from stage to stage whereby the number of times resin will traverse a fin groove varies from stage to stage. More particularly, the numbers of fins in each stage becomes successively less in a sequence from the stage of fins 103, to fins 104 and to fins 105.

In each of the preferred embodiments shown in FIGS. 17 to 19, the cross-sectional areas of the grooves are different from those of the grooves in the other stages. Thus, the time necessary for resin to pass through a stage of the fins varies from stage to stage decreasing in the downstream direction.

Figure 20:
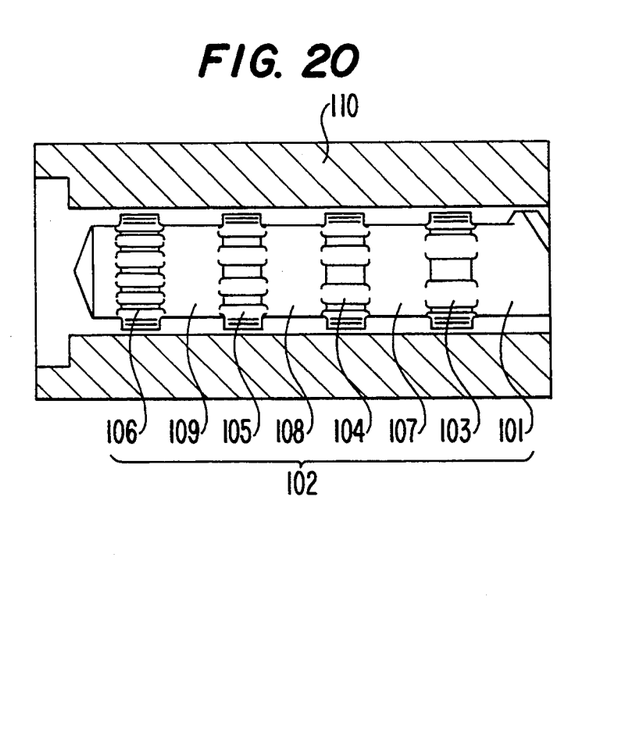
FIG. 20 is a perspective view of a tip end portion of a fifth preferred embodiment of a high mixing-kneading performance screw according to the present invention.

FIG. 20 shows the dulmage a fifth preferred embodiment of a dulmage screw. In this embodiment various features of the fins are identical through the several stages thereof but the numbers of fins in the respective stages of fins 103, 104, 105 and 106 increase successively from stage to stage in the downstream direction.

While a principle of the present invention has been described above in connection with a number of preferred embodiments of the invention, it is intended that all matter contained in the above description and illustrated in the accompanying drawings be interpreted as illustrative of the invention and not in a limiting sense.

What is claimed is:

1. A serial two-stage extruder comprising:
a first-stage extruder including a barrel defining a raw material feed port and an outlet, and a rotatable screw disposed in said barrel, said screw including a feed section, a mixing section and a metering section disposed coaxially in the foregoing sequence in a direction from said feed port to said outlet, said feed section having an axial length within a range of 5 to 9 times the major diameter thereof, and said barrel having an inner cylindrical wall surrounding the feed section of said screw, said mixing section having a hexagonal cross section and a lead within a range of 1 to 3 times the major diameter thereof, and said barrel having an inner wall of a hexagonal cross section surrounding the mixing section of said screw, said metering section defining grooves between adjacent thread forms thereof, said grooves having a depth within a range of 0.07 and 0.11 times the major diameter of the metering section of said screw, and said barrel having an inner cylindrical wall surrounding the metering section of said screw; and a second-stage extruder connected to the outlet of the barrel of said first-stage extruder so as to receive material extruded from the first-stage extruder.

2. A serial two-stage extruder as claimed in claim 1, wherein said second stage extruder includes a second stage extruder screw and a second barrel in which said second stage extruder screw is disposed, said second stage extruder screw having grooves between adjacent thread forms thereof of a depth within a range of 0.11 and 0.2 times the major diameter of the second stage extruder screw, and a dulmage at the tip end of the second stage extruder screw, said dulmage including a plurality of fins extending radially from the tip end of said second stage extruder screw and spaced from one another in the axial direction of the second stage extruder screw, said second barrel having an inner wall of a circular cross section surrounding said second stage extruder screw, and a plurality of fins extending radially inwardly toward said dulmage, the fins of said dulmage of the second stage extruder screw and the fins of said second barrel being disposed alternately with respect to one another in the axial direction of the second stage extruder screw.

3. A serial two-stage extruder as claimed in claim 2, wherein said second stage extruder includes a shaft seal comprising a viscoseal sleeve interposed between a base portion of said second stage extruder screw, remote from the tip end thereof, and said second barrel, said viscoseal sleeve defining a groove open to the base portion of said second stage extruder screw, said groove having the form of multiple thread forms each of a square cross section, and said seal device including a cooling jacket in a portion of said viscoseal sleeve adjacent said multiple thread forms.

4. A serial two-stage extruder as claimed in claim 3, wherein said second barrel defines a feed port therein open to the interior thereof, and said second stage extruder screw has a sealing groove therein at a location between said feed port and said base portion, the sealing groove having the form of multiple thread forms each of a square cross section.

5. A serial two-stage extruder as claimed in claim 3, wherein the base portion of said second stage extruder screw has a bore extending axially therein to facilitate cooling the base portion of said second stage extruder screw.

* * * * *